UNITED STATES PATENT OFFICE.

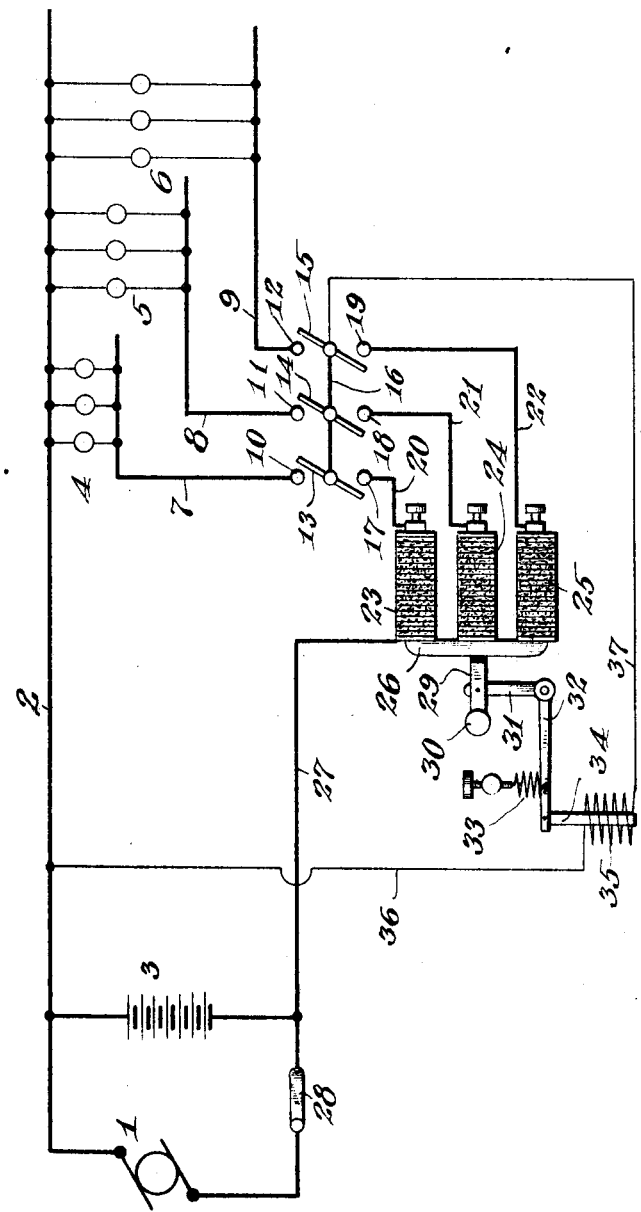

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,165,075.

Specification of Letters Patent.     Patented Dec. 21, 1915.

Application filed November 5, 1910. Serial No. 590,836.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to automatically regulate an electric circuit in a predetermined manner.

My invention has for its particular object to provide means whereby the voltage impressed upon lamps or other translating devices may be held constant throughout changes of voltage at the source from which the same are fed.

A further object of my invention is to provide means for automatically regulating the voltage impressed upon translating devices, the current consumption of which is subject to wide variations.

As my invention is particularly applicable to a system wherein a generator is used for charging a storage battery and operating lamps or other translating devices in connection therewith, it will be described with reference to such a system.

The drawing is a diagrammatic representation of one form of such a system in which the elements of my invention are embodied.

In the drawing, 1 represents a dynamo or generator the positive brush of which is connected as by lead 2 with one side of the storage battery 3, and one side of the groups of lamps or other translating devices indicated at 4, 5, and 6 respectively. The other sides of the groups of translating devices are led to the mains 7, 8 and 9 respectively, which lead to contacts 10, 11 and 12 respectively, of a series of switches having contact knives or members 13, 14 and 15, adapted upon closing of the switches, to connect the said mains with the contacting members 17, 18 and 19 respectively. The said knives or contact members 13, 14 and 15 are all electrically connected together as by means of the wire 16, so that, for example, when the member 13 is so swung as to electrically connect 10 and 17, the wire 16 will be in electrical connection with the wires 7 and 20 for a purpose, which will hereinafter more plainly appear. The contacts 17, 18 and 19 are connected as by wires 20, 21 and 22 to the variable resistances 23, 24 and 25, respectively, which, in this instance are indicated as carbon pile resistances. The other ends of the said carbon piles are electrically connected together as by means of the yoke 26 from which the lead 27 is carried to the negative pole of the battery 3 and through the switch 28 to the negative pole of the generator 1. The yoke 26 is carried by the member 29 and is insulated therefrom as indicated and counterbalanced as by means of the weight 30. The member 29 is pivotally carried upon the arm 31 of a bell crank-lever. 33 is an adjustable spring normally intended to move the lever and press the carbon piles 23, 24 and 25 and reduce the resistance thereof. The arm 32 carries the core 34 of iron or other magnetic material, which is surrounded by the solenoid 35 in such manner that excitation of the said solenoid tends to depress the arm 32 and lessen the pressure upon carbon piles 23, 24 and 25 and increase the resistance thereof. The solenoid 35 is connected with the lead 2 as by means of the wire 36 and with the wire 16 as by means of the wire 37.

The practical operation of my invention is substantially as follows: If the generator be running and having a voltage in excess of the storage battery and the switch 28 be closed, current will flow from the generator through lead 2, battery 3, lead 27, switch 28 to the generator, which current will serve to charge the battery. If now, it be desired to throw on the translating devices indicated by the group 4, the switch 13 may be closed and current will then flow through the generator from lead 2, translating devices 4, main 7, contact member 10, switch member 13, contact member 17, wire 20, carbon pile 23 and lead 27, and it will be obvious that the voltage impressed upon the translating devices 4 will depend upon the resistance of the carbon pile 23, which, in turn will depend upon the pressure applied to the said pile. With the switch member 13 closed current will also flow from the lead 2 through the wire 36, solenoid 35, wire 37 and wire 16, to the wire 20 and this current will depend upon the voltage impressed upon the translating devices 4 which in turn will depend upon the resistance 23. This current in the coil 35 will tend to draw downwardly upon the core 34 so as to depress the lever 32 against the action of spring 33 and increase the resistance of the pile 23 and thus tend to lower the voltage across the translating devices 4. I so adjust the spring 33, that when the normal voltage across the translating devices 4 is reached, any appreciable increase above this amount, will cause the lever 32 to be depressed and the resistance 23 to be increased in such manner as to hold the voltage constant. Therefore, if now, the voltage across the generator shall rise, as for example, when the batteries become charged, the voltage across the translating devices 4 will tend to rise and the current in coil 35 will tend to rise and thus cause the resistance 23 to be increased in such manner as to hold the voltage of the translating devices 4 substantially constant. If now, it be desired to throw on the translating devices indicated at 5, the switch member 14 may be closed across the contacts 11 and 18 and then current will flow from the lead 2 through translating devices 5, main 8, contact 11, switch member 14, contact 18, wire 21, carbon pile 24 to lead 27. As the load indicated at 5 is thrown on as above described, it will be noted that the carbon pile 24 is simultaneously thrown into circuit in shunt with the carbon pile 23 in such manner as to increase the carrying capacity of the resistance varying device governed by coil 35, as the load is thrown on. If it be desired to throw on the translating devices indicated at 6, the switch member 15 may be thrown so as to cause connection between 12 and 19 and then current will flow from the lead 2, through the translating devices 6, main 9, contact 12, member 15, contact 19, wire 22, resistance 25, lead 27 and, with the three translating circuits now thrown on across the leads, there are also three carbon piles all in multiple to carry the load.

It will be obvious that the various groups of translating devices will all be subjected to the same voltage as the mains 7, 8 and 9 will be in electrical connection with each other through the wire 16 when their respective switches are closed, and the coil 35 will be subjected to any changes in voltage across the translation circuits, regardless of which switches are closed, owing to the connection of wire 16 with all the circuits in operation and it will be plain from the above description of the effect of the current and coil 35, that the same will tend to hold the voltage upon all the translation circuits, constant through variations in the supply circuit.

It will be obvious that as many groups of translating devices, shown as three in number in the drawing, may be employed as desired and that as each group is thrown into circuit across the leads, the capacity of the automatic resistance regulating means will be accordingly increased. It will also be noted that as any of the circuits containing translating devices are thrown out by their respective switches, the corresponding varying element or carbon pile is thrown out of circuit in such manner that when the load is thrown off the range of the automatic resistance varying device in a direction of increasing the resistance is increased inasmuch as the multiple resistors are withdrawn from circuit as the circuits are cut out. In this manner I provide an automatic resistance voltage regulating means capable of increasing the drop in a circuit through a wide range and also capable of carrying heavy currents with little drop when desired.

It will be obvious that any number of resistors may be used and that any type of resistor suitable for the purpose may be employed; also that any means may be employed for automatically operating the resistance varying means, which in this instance I have indicated as operated by the solenoid 35 for the sake of simplicity, the same being a well known construction used in this type of systems.

I do not wish in any way to limit myself to the exact construction or details set forth in the accompanying drawing which is a mere diagrammatic representation of one type of electric system, embodying my invention, for it will be obvious that wide departure may be made in the practice of my invention without departing from the spirit or scope thereof, which is as set forth in the following claims:—

1. Means for regulating a plurality of electric circuits comprehending a plurality of variable resistances, means for controlling said resistances and means whereby said resistances are rendered jointly operative and inoperative upon manipulation of said circuits.

2. Means for regulating a plurality of electric circuits, comprehending a plurality of variable resistances, means for governing said resistances and means whereby said resistances are placed in operative relation to each other upon closing of said circuits.

3. Means for regulating a plurality of electric circuits comprehending a plurality of resistances in the circuits, automatic means for controlling the value of said resistances and means for rendering the said resistances conjointly operative when their respective circuits are rendered operative.

4. Means for regulating a plurality of electric circuits comprehending a plurality of jointly coöperating circuit regulating means, means for controlling the same affected by a characteristic common to all of said circuits that are operative and means for rendering the regulating means in each circuit inoperative.

5. Means for regulating a plurality of electric circuits, comprehending a resistance varying element in series with each circuit, means for connecting said resistances in coöperative relation to each other and automatic means for varying said resistances.

6. Means for regulating a plurality of electric circuits comprehending a plurality of circuit regulating elements in the circuits, means whereby said regulating elements coöperate in jointly regulating said circuits, a common means for governing said regulating elements and means for causing a common characteristic in said circuits to operate said governing means.

7. Means for regulating a plurality of electric circuits comprehending a plurality of jointly coöperating circuit regulating means, means for controlling the same affected by a characteristic common to all of said circuits that are operative and means for rendering the regulating means in each circuit inoperative with respect to the other circuit regulating means upon rendering the circuit inoperative.

8. In combination a plurality of electric circuits, a plurality of regulating elements in said circuits; and independent switches for connecting said circuits adapted when closed to connect said regulating means in multiple in the circuits.

9. In combination, a plurality of normally open electric circuits; a plurality of regulating elements connected respectively in said circuits; independent switches for closing said circuits; and means responsive to conditions affecting said circuits for controlling said elements when one or more of the circuits is closed.

10. Means for regulating a plurality of electric circuits comprehending a plurality of regulating elements in multiple; independent switches for closing said circuits; and means for controlling said regulating elements.

11. In combination a plurality of electric circuits; independent switches in said circuits, whereby closing of said switches connects said circuits; regulating means in multiple with each other; and automatic means for controlling said regulating elements responsive to a common characteristic of the circuits.

12. The combination with a source of electro-motive force and a plurality of circuits supplied thereby, of means for regulating said circuits comprehending a plurality of regulating units, means for opening and closing said circuits and means whereby the mutual relationship of said regulating elements is affected by the operation of said circuit opening and closing means.

13. The combination with a supply circuit and a plurality of work circuits, of means for regulating the work circuits comprehending a plurality of regulating units between the supply circuit and the work circuits, switches in the work circuits and means electrically connecting the switches with each other whereby closing of said switches connects said circuits in multiple with each other.

14. The combination with a supply circuit and a plurality of work circuits, of a plurality of regulating units in operative relation to said circuits, means for opening and closing said circuits and means for rendering a characteristic of said circuits common to each upon closing of said circuits.

15. The combination with a supply circuit and a plurality of work circuits, of a plurality of regulating resistances for the work circuits, automatic means for operating the same and connections whereby closing of any of the work circuits renders said operating means operative and the opening of all of said work circuits renders said operating means inoperative.

16. In apparatus of the class described, in combination, a source of current, a plurality of lamp circuits, means adapted separately to connect said lamp circuits to said source of current, a plurality of variable resistance media, one of which is serially connected in each lamp circuit, and means controlled in accordance with the voltage across the lamps adapted to vary said media to maintain said voltage substantially constant.

17. In apparatus of the class described, in combination, a source of current, a plurality of lamp circuits, means adapted separately to connect said lamp circuits to said source of current, a plurality of variable resistance media, one of which is serially connected in each lamp circuit, and means controlled in accordance with the voltage across the lamps adapted to vary said resistance media simultaneously to maintain the voltage across the lamps substantially constant.

18. In apparatus of the class described, in combination, a source of current, a plurality of lamp circuits, means adapted separately to connect said lamp circuits to said source of current, a plurality of variable resistance media, one of which is serially connected in each lamp circuit, and voltage-controlled means connected across a lamp circuit on the lamp side of said connecting means adapted to vary said media to maintain the voltage across the lamps substantially constant.

19. In apparatus of the class described, in combination, a source of current, a plurality of lamp circuits, means adapted separately to connect said lamp circuits to said source of current, a plurality of variable resistance media, one of which is serially connected in each lamp circuit, and voltage-controlled means connected across the lamp circuits on the lamp side of said connecting means adapted to vary said media simultaneously to maintain the voltage across the lamps substantially constant.

20. In apparatus of the class described, in combination, a source of power, a plurality of lighting circuits each comprising a pair of conductors in one of which a resistance medium is serially connected, and a bank of lamps bridged in parallel across said conductors, means adapted to connect said lighting circuits with said source in parallel one with another, means adapted simultaneously to vary said resistance media, and means controlled in accordance with the voltage across said lamps adapted to actuate said resistance-varying means.

JOHN L. CREVELING.

Witnesses:
A. E. TUERS,
M. E. HILLOCK.